United States Patent [19]
Saito

[11] Patent Number: 5,920,543
[45] Date of Patent: Jul. 6, 1999

[54] DOUBLE RING-TYPE LOCAL AREA NETWORK SYSTEM CAPABLE OF SWITCHING TRANSMISSION PATHS WITHOUT INTERRUPTION

[75] Inventor: Masao Saito, Tokyo, Japan

[73] Assignee: NEC Corporation, Tokyo, Japan

[21] Appl. No.: 08/880,884

[22] Filed: Jun. 23, 1997

[30] Foreign Application Priority Data

Jun. 21, 1996 [JP] Japan .................................. 8-181466

[51] Int. Cl.⁶ ...................................... H04J 3/14
[52] U.S. Cl. .......................... 370/223; 370/508; 370/517
[58] Field of Search .................................. 370/222, 223, 370/224, 245, 249, 403, 404, 405, 406, 424, 508, 248, 516, 517; 371/37.7, 37.01; 375/371; 340/825.01; 395/183.19, 183.01

[56] References Cited

U.S. PATENT DOCUMENTS

| | | |
|---|---|---|
| 5,307,353 | 4/1994 | Yamashita et al. . |
| 5,469,428 | 11/1995 | Tokura et al. . |
| 5,745,476 | 4/1998 | Chaudhuri . |

FOREIGN PATENT DOCUMENTS

61-264942  11/1986  Japan .
63-228849   9/1988  Japan .

*Primary Examiner*—Chau Nguyen
*Assistant Examiner*—Kenneth H Vanderpuye
*Attorney, Agent, or Firm*—Foley & Lardner

[57] ABSTRACT

In a ring-type network system including a plurality of nodes connected by an L-ring and a R-ring, each of the nodes is constructed by a branch unit for branching data to first and second directions, a first delay unit for delaying the data in the first direction by a first delay time period, a second delay unit for delaying the data in the second direction by a second delay time period, a first combiner for inserting the delayed data in the first direction into a first time slot of a data frame on the L-ring, and a second combiner for inserting the delayed data in the second direction into a first time slot of a data frame on the R-ring. Also, each of the nodes is constructed by a first distributor for extracting data from a second time slot of a data frame on the L-ring, a second distributor for extracting data from a second time slot of a data frame on the R-ring, a third delay unit for delaying the data extracted by the first distributor by a third delay time period, a fourth delay unit for delaying the data extracted the second distributor by a third delay time period, and a switching unit for passing one of outputs of the third and fourth delay units.

8 Claims, 6 Drawing Sheets

| LTS$_{a-b}$ | LTS$_{b-a}$ | LTS$_{a-c}$ | LTS$_{c-a}$ | LTS$_{a-d}$ | LTS$_{d-a}$ | LTS$_{b-c}$ | LTS$_{c-b}$ | LTS$_{b-d}$ | LTS$_{d-b}$ | LTS$_{c-d}$ | LTS$_{d-c}$ |

*Fig. 3A*

| RTS$_{a-b}$ | RTS$_{b-a}$ | RTS$_{a-c}$ | RTS$_{c-a}$ | RTS$_{a-d}$ | RTS$_{d-a}$ | RTS$_{b-c}$ | RTS$_{c-b}$ | RTS$_{b-d}$ | RTS$_{d-b}$ | RTS$_{c-d}$ | RTS$_{d-c}$ |

DOUBLE RING-TYPE LOCAL AREA NETWORK SYSTEM CAPABLE OF SWITCHING TRANSMISSION PATHS WITHOUT INTERRUPTION

BACKGROUND OF THE INVENTION

1. Field of the Invention

The present invention relates to a communication system, and more particularly, a double ring-type local area network (LAN) system using time division multiple access (TDMA).

2. Description of the Related Art

In a prior art double ring-type CAN system, a plurality of nodes are connected by a counterclockwise signal flow transmission line and a clockwise signal flow transmission line that provide distinct communication paths between each node in opposite directions. When a fault occurs in one of the transmission lines, data traveling between nodes on one communication path may be switched to travel between the nodes on the other communication path. On the other hand, when the fault which occurred in the above-mentioned transmission line recovers, the data switched to the other communication path may be switched back to the original communication path. This will be explained later in detail.

Thus, when the above-mentioned switching occurs in the communication paths, the continuity of signal transmission may be distrusted due to the difference in transmission delay time before and after the switching. Therefore, although the prior art ring-type LAN system is applicable to discrete communications such as packet communications, the prior art ring-type LAN system cannot be applied to complications over dedicated lines, since the quality of transmission is degraded.

SUMMARY OF THE INVENTION

It is an object of the present invention to provide a double ring-type LAN system capable of switching transmission paths without interruption.

According to the present invention, in a ring-type network system including a plurality of nodes connected by an L-ring and an R-ring, each of the nodes includes a branch unit for branching data to first and second directions, a first delay unit for delaying the data in the first direction by a first delay time period, a second delay unit for delaying the data in the second direction by a second delay time period, a first combiner for inserting delayed data in the first direction into a first time slot of a data frame on the L-ring, and a second combiner for inserting delayed data in the second direction into a first time slot of a data frame on the R-ring. Also, each of the nodes includes a first distributor for extracting data from a second time slot of a data frame on the L-ring, a second distributor for extracting data from a second time slot of a data frame on the R-ring, a third delay unit for delaying the data extracted by the first distributor by a third delay time period, a fourth delay unit for delaying the data extracted the second distributor by a fourth delay time period, and a switching unit for passing one of outputs of the third and fourth delay units.

If the transmission delay times of the two transmission paths are made equal to each other, a switching operation of the switching unit does not give rise to any interruption in the signal transmission.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENT

Before the description of the preferred embodiment, a prior art double ring-type LAN system will be explained with reference to FIGS. 1A and 1B (see: JP-A-63-228849 & JP-A-61-264942).

Figure 1A:
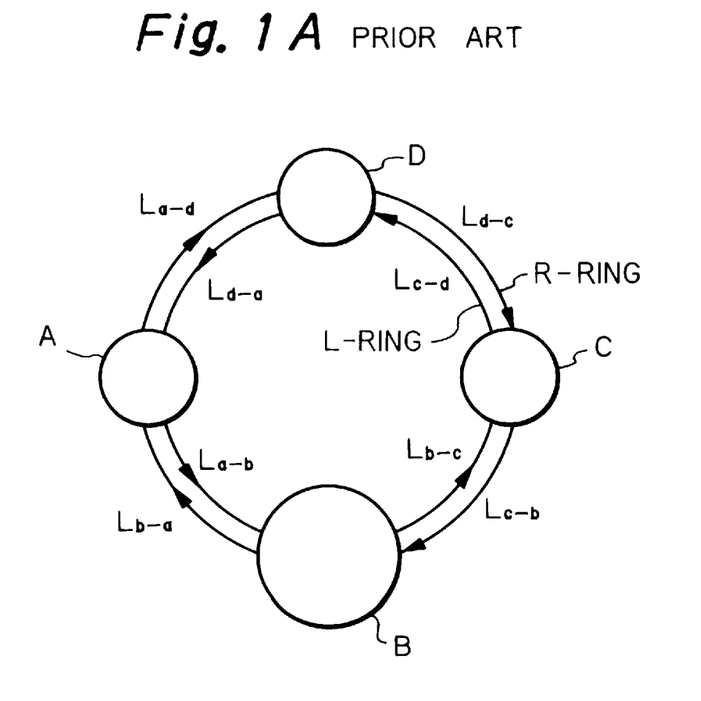
FIGS. 1A and 1B are circuit diagrams illustrating a prior art double ring-type LAN system.

In FIG. 1A, four nodes A, B, C and D are connected by a left-hand (L)-ring for a counterclockwise signal flow and a right-hand (R)-ring for a clockwise signal flow. The L-ring is formed by transmission lines $L_{a-b}$, $L_{b-c}$, $L_{c-d}$ and $L_{d-a}$, and the R-ring is formed by transmission lines $L_{a-d}$, $L_{d-c}$, $L_{c-b}$ and $L_{b-a}$.

In FIG. 1A, if the transmission lines $L_{a-b}$ and $L_{b-a}$ are normal communication between the nodes A and B is carried out by using the transmission lines $L_{a-b}$ and $L_{b-a}$.

Figure 1B:
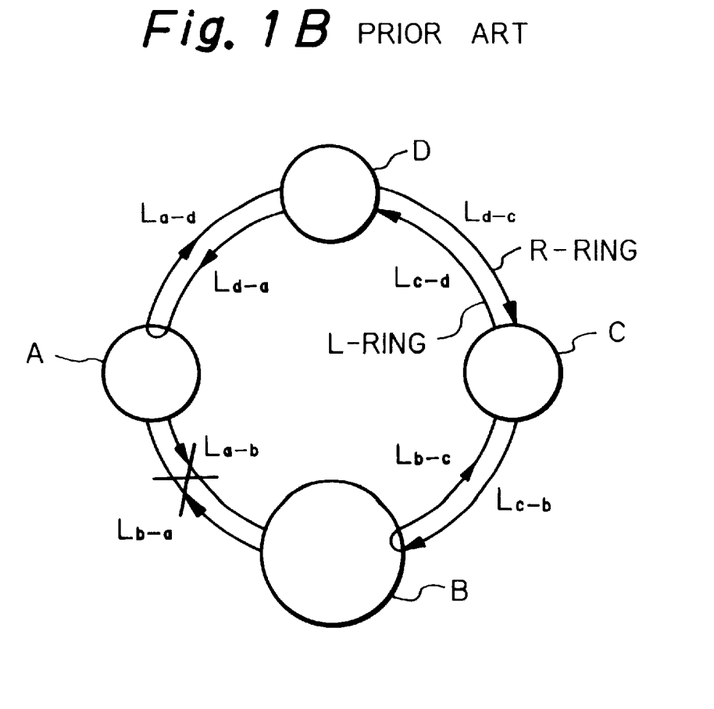

On the other hand, as illustrated in FIG. 1B, if the transmission lines $L_{a-b}$ and $L_{b-a}$ are abnormal, i.e., in a fault state, communication between the nodes A and B is carried out by the transmission lines $L_{a-d}$, $L_{d-c}$ and $L_{c-b}$ and the transmission lines $L_{b-c}$, $L_{c-d}$, and $L_{d-a}$.

Therefore, when a fault occurs in the transmission lines $L_{a-b}$ and $L_{b-a}$, a communication path formed by the transmission line $L_{a-b}$ is switched to a communication path foxed by the transmission lines $L_{a-d}$, $L_{d-c}$ and $L_{c-b}$, and simultaneously, a communication path formed by the transmission line $L_{b-a}$ is switched to a communication path formed by the transmission lines $L_{b-c}$, $L_{c-d}$ and $L_{d-a}$.

On the other hand, when the fault which occurred in the transmission lines $L_{a-b}$ and $L_{b-a}$ recovers, the communication path formed by the transmission lines $L_{a-d}$, $L_{d-c}$ and $L_{c-b}$ is switched to the communication path formed by the transmission line $L_{a-b}$, and simultaneously, the communication path formed by the transmission lines $L_{b-c}$, $L_{c-d}$ and $L_{d-a}$ is switched to the communication path formed by the transmission line $L_{b-a}$.

Note that the above-mentioned switching of the communication paths may occur for maintenance purposes.

Thus, when the above-mentioned switching occurs in the communication paths, the continuity of signal transmission may be distrupted due to the difference in transmission delay time before and after the switching. Therefore, although the prior art ring-type LAN system of FIGS. 1A and 1B is applicable to discrete communications such as packet communications, the prior art ring-type LAN system of FIGS. 1A and 1B cannot be applied to communications over dedicated lines, since the quality of transmission is degraded.

Figures 2, 2A:
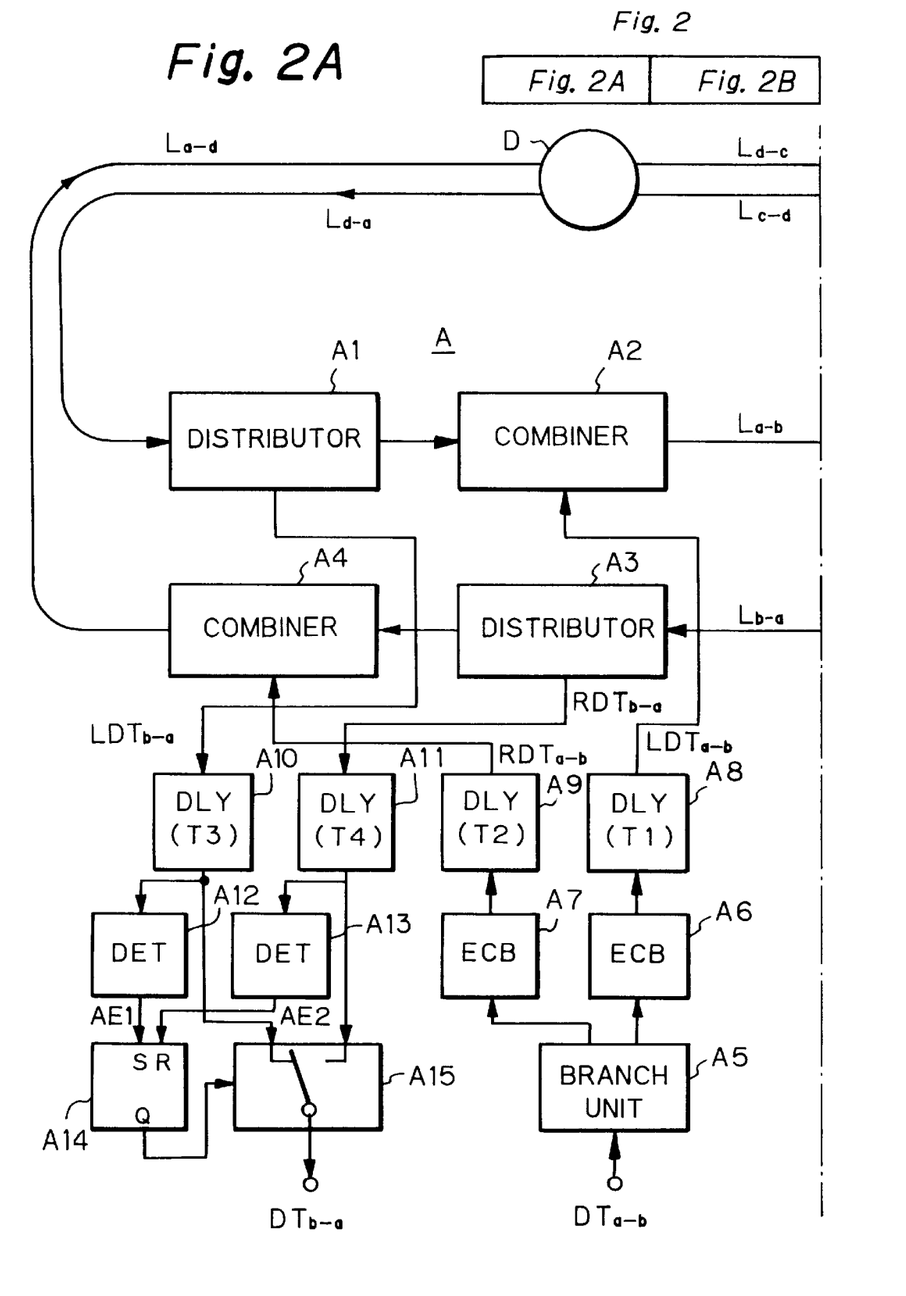
FIGS. 2A and 2B are circuit diagrams illustrating an embodiment of the double ring-type LAN system according to the present invention.
Figure 2B:
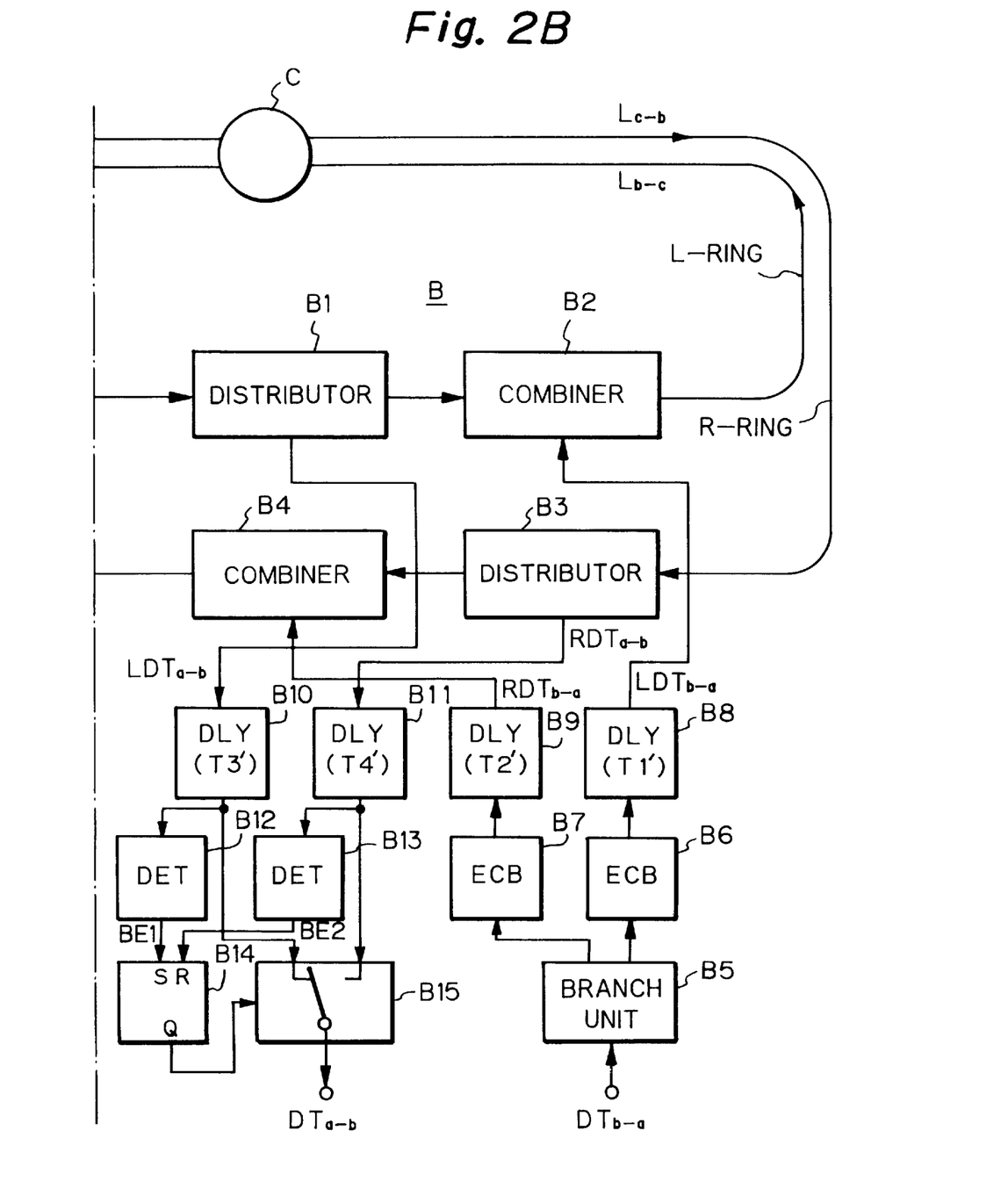
Figure 3A:
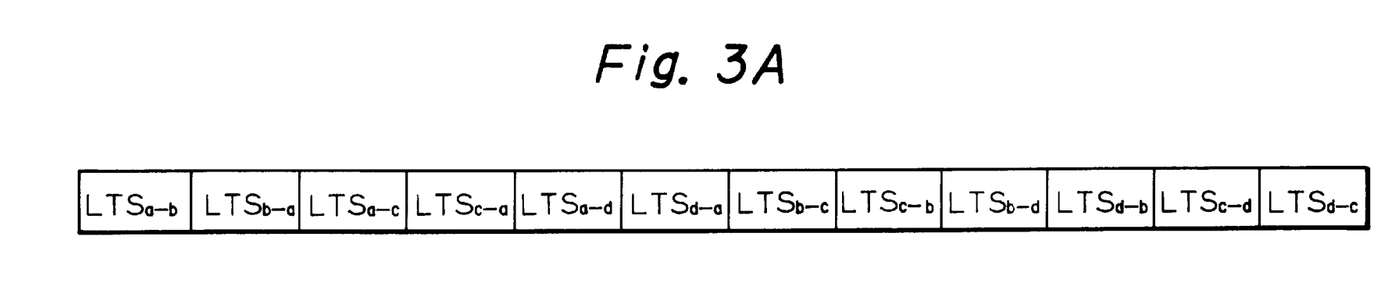
FIG. 3A is a data format of a data frame on the L-ring of FIGS. 2A and 2B.
Figure 3B:
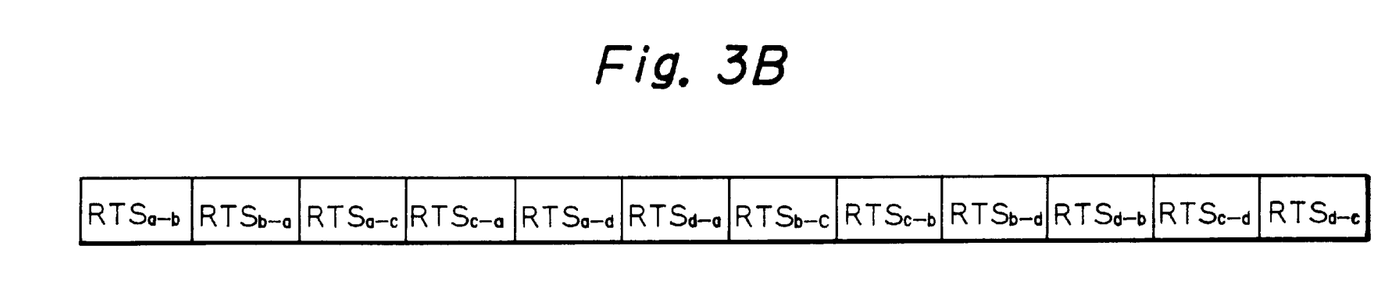
FIG. 3B is a data format of a data frame on the R-ring of FIGS. 2A and 2B.

FIGS. 2A and 2B are block diagrams illustrating an embodiment of the double ring-type LAN system according to the present invention, which can be applied to a TDMA system. In this TDMA system, note that a data frame on the L ring formed by the transmission lines $L_{a-b}$, $L_{b-c}$, $L_{c-d}$ and $L_{d-a}$ is divided into time slots $LTS_{a-b}$, $LTS_{b-a}$, $LTS_{a-c}$, $LTS_{c-a}$, ..., $LTS_{c-d}$ and $LTS_{d-c}$ as shown in FIG. 3A, and a data frame on the R ring formed by the transmission lines $L_{a-d}$, $L_{d-c}$, $L_{c-b}$ and $L_{b-a}$ is divided into time slots $RTS_{a-b}$, $RTS_{b-a}$, $RTS_{a-c}$, $RTS_{c-a}$, ..., $RTS_{c-d}$ and $RTS_{d-c}$ as shown in FIG. 3B. For example, the time slots $LTS_{a-b}$ and $RTS_{a-b}$ are allocated for the transmission of data $DT_{a-b}$ from the node A to the node A, and the time slots $LTS_{b-a}$ and $RTS_{b-a}$ are allocated for the transmission of data $DT_{b-a}$ from the node B to the node A.

In FIGS. 2A and 2B, the nodes A and B are illustrated in detail for showing transmission of the data $DT_{a-b}$ and $DT_{b-a}$, and the circuits for transmission of the data $DT_{a-c}$, $DT_{c-a}$, $DT_{a-d}$ and $DT_{d-a}$ are omitted for simplifying the description.

In the node A, a distributor A1 and a combiner A2 are inserted in the L-ring, and a distributor A3 and a combiner A4 are inserted in the R-ring.

A branch unit A5 branches data $DT_{a-b}$ to error check bit allocating units A6 and A7. In the error check bit allocating units A6 and A7, error check bits are calculated for the data $DT_{a-b}$, and as a result, each of the error check bits is allocated to the data $DT_{a-b}$. The data $DT_{a-b}$ associated with one of the error check bits is delayed by a time period T1 in a delay unit A8, and then, in the combiner A2, the delayed data $DT_{a-b}$ associated with the error check bit is inserted as data $LDT_{a-b}$ in the time slot $LTS_{a-b}$ of a data frame on the L-ring. Simultaneously, the data $DT_{a-b}$ associated with the other of the error check bits is delayed by a time period T2 in a delay unit A9, and then, in the combiner A4, the delayed data $DT_{a-b}$ associated with the error check bit is inserted as data $RDT_{a-b}$ in the time slot $RTS_{a-b}$ of a data frame on the R-ring.

On the other hand, a delay unit A10 receives data $LDT_{b-a}$ of the time slot $LTS_{b-a}$ of a data frame on the L-ring in the distributor A1, so that the data $LDT_{b-a}$ is delayed by a time period T3. Also, a delay unit A11 receives data $RDT_{b-a}$ of the time slot $RTS_{b-a}$ of a data frame on the R-ring in the distributor A3, so that the data $RDT_{b-a}$ is delayed by a time period T4. Then an err detector A12 calculates an error check bit from the output of the delay unit A10, and compares the calculated error check bit with the error check bit included in the output of the delay unit A10. Only if both of the error check bits are different from each other, does the error detector A12 generate an error detection signal AE1. Simultaneously, an error detector A13 calculates an error check bit from the output of the delay unit A11, an compares the calculated error check bit with the error check bit included in the output of the delay unit A11. Only if both of the error check bits are different from each other, does the error detector A13 generate an error detection signal AE2. Further, a logic unit A14 such as an RS flip-flop receives the error detection signals AE1 and AE2 to control a switching unit A15. For example, when the error detection signal AE1 is generated, the logic unit A14 generates a high level signal so that the switching unit A15 passes the output of the delay unit A11 as data $DT_{b-a}$. On the other hand, when the error detection signal AE2 is generated, the logic unit A14 generates a low level signal so that the switching unit A15 passes the output of the delay unit A10 as data $DT_{b-a}$.

In the node A, a distributor B1 and a combiner B2 are inserted in the L-ring, and a distributor B3 and a combiner B4 are inserted in the R-ring.

Also, a branch unit B5 branches data $DT_{b-a}$ to error check bit allocating units B6 and B7. In the error check bit allocating units B6 and B7, error check bits are calculated for the data $DT_{b-a}$, and as a result, each of the error check bits is allocated to the data $DT_{b-a}$. The data $DT_{b-a}$ associated with one of the error check bits is delayed by a time period T1' in a delay unit B8, and then, in the combiner B2, the delayed data $DT_{b-a}$ associated with the error check bit is inserted as data $LDT_{b-a}$ in the time slot $LTS_{b-a}$ of a data frame on the L-ring. Simultaneously, the data $DT_{b-a}$ associated with the other of the error check bits is delayed by a time period T2' in a delay unit B9, and then, in the combiner B4, the delayed data $DT_{b-a}$ associated with the error check bit is inserted as data $RDT_{b-a}$ in the time slot $RTS_{b-a}$ of a data frame on the R-ring.

On the other hand, a delay unit B10 receives data $LDT_{a-b}$ of the time slot $LTS_{a-b}$ of a data frame on the L-ring in the distributor B1, so that the data $LDT_{a-b}$ is delayed by a time period T3'. Also, a delay unit B11 receives data $RDT_{a-b}$ of the time slot $RTS_{a-b}$ of a data frame on the R-ring in the distributor B3, so that the data $RDT_{a-b}$ is delayed by a time period T4'. Then, an error detector B12 calculates an error check bit from the output of the delay unit B10, and compares the calculated error check bit with the error check bit included in the output of the delay unit B10. Only if both of the error check bits are different from each other, does the error detector B12 generate an error detection signal BE1. Simultaneously, an error detector B13 calculates an error check bit from the output of the delay unit B11, and compares the calculated error check bit with the error check bit included in the output of the delay unit B11. Only if both of the error check bits are different from each other, does the error detector B13 generate an error detection signal BE2. Further, a logic unit B14 such as an RS flip-flop receives the error detection signals BE1 and BE2 to control a switching unit B15. For example, when the error detection signal BE1 is generated, the logic unit B14 generates a high level signal so that the switching unit B15 passes the output of the delay unit B11 as data $DT_{a-b}$. On the other hand, when the error detection signal BE2 is generated, the logic unit B14 generates a low level signal so that the switching unit B15 passes the output of the delay unit B10 as data $DT_{a-b}$.

The data $DT_{a-b}$ is transmitted from the node A to the node B via the following two transmission paths:

A5→A6→A8→A2→(L-RING)→B1→B10→B15

A5→A7→A9→A4→(R-RING)
→B3→B11→B13→B15

In this case, a sum of the time periods T1 and T3' and a sum of the time periods T2 and T4' are predetermined, so that the delay time of transmission of the data $DT_{a-b}$ via the L-ring is substantially the same as the delay time of transmission of the data $DT_{a-b}$ via the R-ring.

Also, one of the above-mentioned two transmission paths is selected by the error detectors B12, B13 and the logic unit B14.

In a state where the switching unit B15 passes the signal from the L-ring, if a problem occurs on the transmission line $L_{a-b}$, the error detector B12 detects the problem whereas the error detector B13 does not detect the problem, so that the logic unit B14 causes the switching unit B15 switch to pass the signal from the R-ring. Thus, one of the signal transmission paths can be switched to the other without interrupting the transmission of data.

Similarly, the data $DT_{b-a}$ is transmitted from the node B to the node A via the following two transmission paths:

B5→B6→B8→B2→(L-RING)→A1→A10→A15

B5→B7→B9→B4→(R-RING)
→A3→A11→A13→A15

In this case, a sum of the time periods T1' and T3 and a sum of the time periods T2' and T4 are predetermined, so that the delay time of transmission of the data $DT_{b-a}$ via the L-ring is substantially the same as the delay time of transmission of the data $DT_{b-a}$ via the R-ring.

Also, one of the above-mentioned two transmission paths is selected by the error detectors A12, A13 and the logic unit A14.

In a state where the switching unit A15 passes the signal from the R-ring, if a problem occurs on the transmission line $L_{b-a}$, the error detector A13 detects the problem whereas the error detector A12 does not detect the problem, so that the logic unit A14 causes the switching unit A15 switch to pass the signal from the L-ring. Thus, one of the signal transmission paths can be switched to the other without interrupting the transmission of data.

Note that, if the transmission path through the L-ring or the R-ring is selected, the signal transmission is not interrupted if it is switched to the R-ring or the L-ring for maintenance or some other purpose.

Therefore, a switching operation of the switching unit B15 or A15 does not give rise to any interruption in the transmission of the data $DT_{a-b}$ or $DT_{b-a}$. Also, if the transmission lines are wireless and gradually degraded by a fading phenomenon, for example, then the degradation of the transmission lines can be detected to switch the transmission paths before they become fatal. Thus, any interruption of communication can be minimized or eliminated to provide a reliable transmission path.

Figure 4:
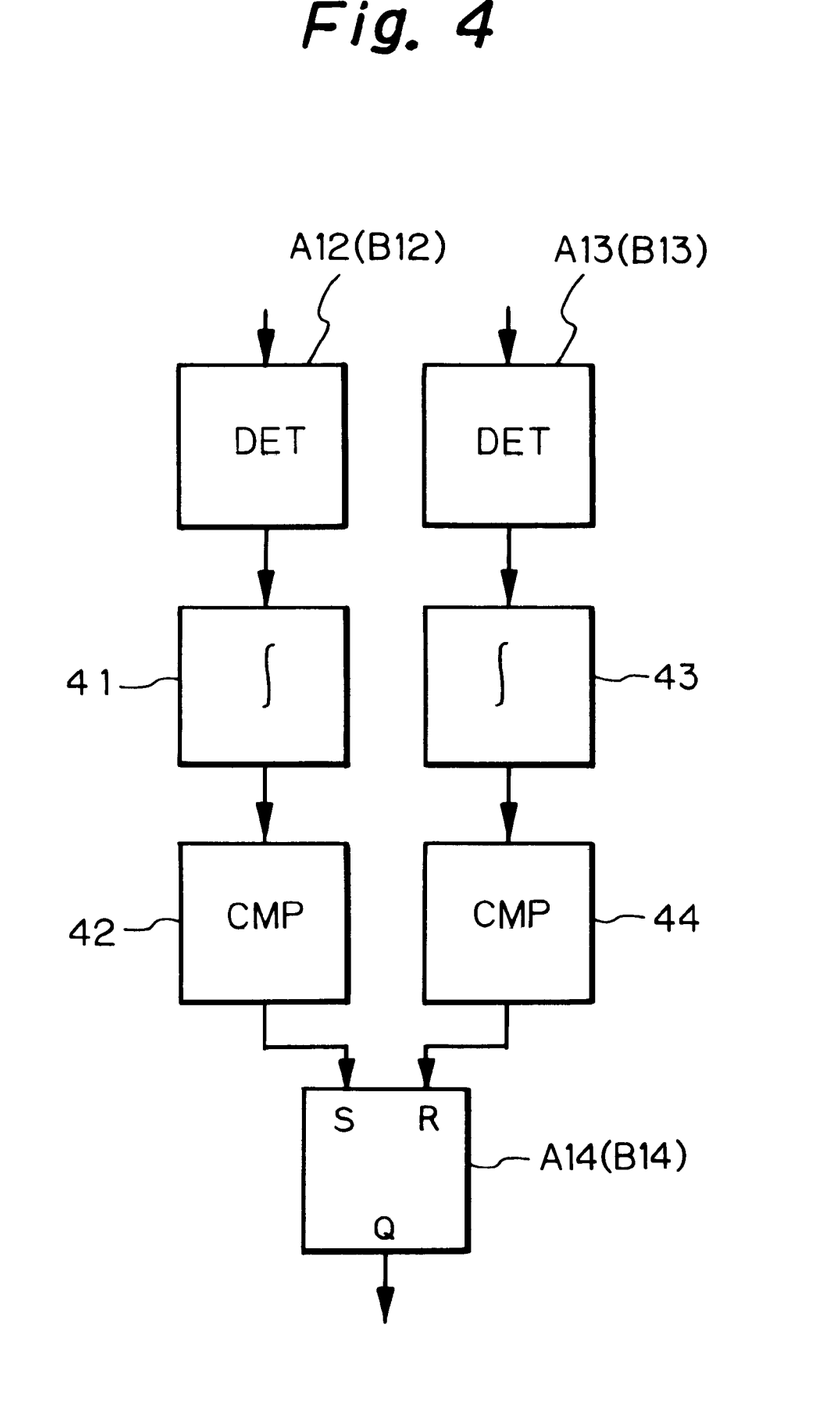
FIG. 4 is a block diagram of a modification of the LAN system of FIGS. 2A and 2B.
Figure 5:
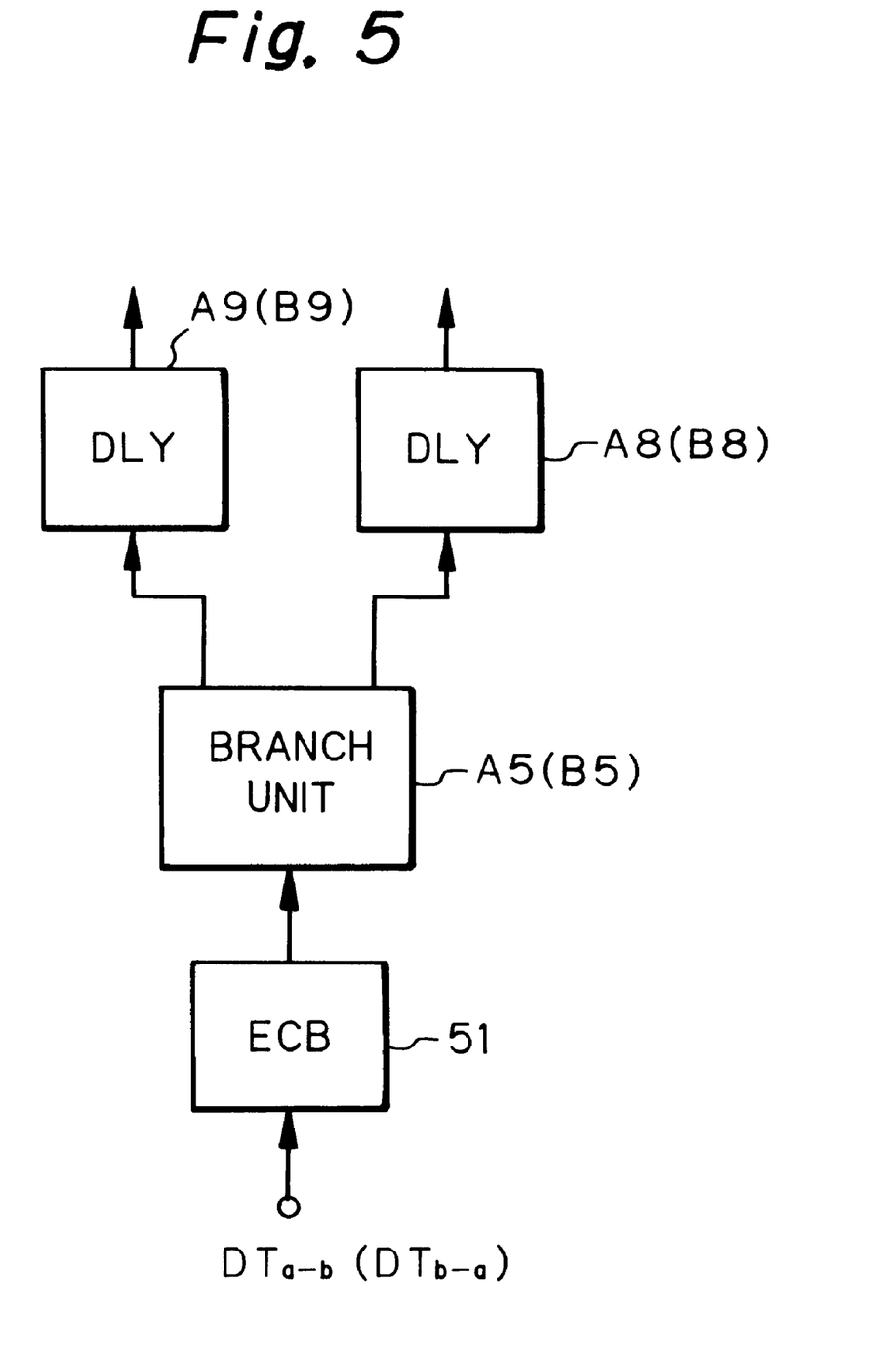
FIG. 5 is a block diagram of another modification of the LAN system of FIGS. 2A and 2B.

In FIGS. 2A and 2B, the switching units A15 and B15 may be of a stable type or a non-stable type. Also, although the outputs of the error detectors A12 and A13 (B12 and B13) are supplied directly to the logic unit A14 (B14), it is possible to interpose an integration unit 41 and a comparator 42 between the error detector A12 (B12) and the logic unit A14 (B14) and interpose an integration unit 43 and a comparator 44 between the error detector A13 (B13) and the logic unit A14 (B14) as illustrated in FIG. 4. In this case, only after one error detector generates a number of continuous error signals, is the state of the logic unit A14 (B14) changed to switch the transmission path, thus avoiding the chattering operation of the switching unit A15 (B15). Further, although the error check bit allocating units A6 and A7 (B6 and B7) are connected to the two outputs of the distributor A5, (B5), it is possible to connect one error check bit allocating unit 51 to the input of the distributor A5 (B5) as illustrated in FIG. 5.

As explained hereinabove, according to the present invention, a switching operation of the switching unit does not give rise to any interruption in the signal transmission because the transmission delay times of the two transmission paths are made equal to each other and the switching operations on the respective transmission paths are carried out in the same time slot for maintenance and other purposes. If a problem occurs on one transmission line, the transmission path can be switched with a minimal interruption, thus establishing a highly reliable transmission.

I claim:

1. A ring-type network system including a plurality of nodes connected by a counterclockwise transmission line (L-ring) and a clockwise transmission line (R-ring), each of said nodes comprising:

a branch unit for branching data directed to one of other nodes to first and second directions;

a first delay unit for delaying the data in said first direction by a first delay time period;

a second delay unit for delaying the data in said second direction by a second delay time period;

a first combiner for inserting the delayed data in said first direction into a first time slot of a data frame on said L-ring;

a second combiner for inserting the delayed data in said second direction into a first time slot of a data frame on said R-ring;

a first distributor for extracting data from a second time slot of a data frame on said L-ring;

a second distributor for extracting data from a second time slot of a data frame on said R-ring;

a third delay unit for delaying the data extracted by said first distributor by a third delay time period;

a fourth delay unit for delaying the data extracted by said second distributor by a fourth delay time period; and a switching unit for passing one of outputs of said third and fourth delay units.

2. The system as set forth in claim 1, wherein a sum of said first delay time period of said one of said nodes and said third delay time period of said one of other nodes and a sum of said second delay time period of said one of said nodes and said fourth delay time period of said one of other nodes are determined so that a transmission time of data from said branching unit of said one of said nodes to said switching unit of said one of other nodes via said L-ring is substantially equal to a transmission time of data from said branching unit of said one of said nodes to said switching unit of said one of other nodes via said R-ring.

3. The system as set forth in claim 1, further comprising:

a first error check bit allocating unit for calculating a first error check bit for the data in said first direction and allocating said error check bit to the data in said first direction;

a second error check bit allocating unit for calculating a second error check bit for the data in said second direction and allocating said error check bit to the data in said second direction;

a first error detector for calculating a third error check bit for the output of said third delay unit and comparing said third error check bit with an error check bit included in the output of said third delay unit to generate a first error detection signal;

a second error detector for calculating a fourth error check bit for the output of said fourth delay unit and comparing said fourth error check bit with an error check bit included in the output of said fourth delay unit to generate a second error detection signal; and a logic unit for controlling said switching unit in accordance with said first and second error detection signals.

4. The system as set forth in claim 3, further comprising:

a first integrator, connected to said first error detector, for integrating said first error detection signal;

a first comparator, connected to said first integrator, for determining whether or not said first error detection signal is continuous, said first error detection signal being transmitted to said logic unit only when said first error detection signal is continuous;

a second integrator, connected to said second error detector, for integrating said second error detection signal; and a second comparator, connected to said second integrator, for determining whether or not said second error detection signal is continuous, said second error detection signal being transmitted to said logic unit only when said second error detection signal is continuous.

5. The system as set forth in claim 1, further comprising:
an error check bit allocating unit for calculating an error check bit for the data input to said branch unit and allocating said error check bit to the data input to said branch unit;
a first error detector for calculating a third error check bit for the output of said third delay unit and comparing said third error check bit with an error check bit included in the output of said third delay unit to generate a first error detection signal;
a second error detector for calculating a fourth error check bit for the output of said fourth delay unit and comparing said fourth error check bit with an error check bit included in the output of said fourth delay unit to generate a second error detection signal; and
a logic unit for controlling said switching unit in accordance with said first and second error detection signals.

6. The system as set forth in claim 5, further comprising:
a first integrator, connected to said first error detector, for integrating said first error detection signal;
a first comparator, connected to said first integrator, for determining whether or not said first error detection signal is continuous, said first error detection signal being transmitted to said logic unit only when said first error detection signal is continuous;
a second integrator, connected to said second error detector, for integrating said second error detection signal; and
a second comparator, connected to said second integrator, for determining whether or not said second error detection signal is continuous, said second error detection signal being transmitted to said logic unit only when said second error detection signal is continuous.

7. A ring-type network system including a plurality of nodes connected by a counterclockwise transmission line (L-ring) and a clockwise transmission line (R-ring), each of said nodes comprising:
a branch unit for branching data directed to one of other nodes to first and second directions;
a first error check bit allocating unit, connected to said branch unit, for calculating a first error check bit for the data in said first direction and allocating said error check bit to the data in said first direction;
a second error check bit allocating unit, connected to said branch unit, for calculating a second error check bit for the data in said second direction and allocating said error check bit to the data in said second direction;
a first delay unit connected to said first error check bit allocating unit, for delaying the data in said first direction by a first delay time period;
a second delay unit, connected to said second error check allocating unit, for delaying the data in said second direction by a second delay time period;
a first combiner, connected to said first delay unit, for inserting the delayed data in said first direction into a first time slot of a data frame on said L-ring;
a second combiner, connected to said second delay unit, for inserting the delayed data in said second direction into a first time slot of a data frame on said R-ring;
a first distributor for extracting data from a second time slot of a data frame on said L-ring;
a second distributor for extracting data from a second time slot of a data frame on said R-ring;
a third delay unit, connected to said first distributor, for delaying the data extracted by said first distributor by a third delay time period;
a fourth delay unit, connected to said second distributor, for delaying the data extracted by said first distributor by a third delay time period;
a first error detector, connected to said third delay unit, for calculating a third error check bit for the output of said third delay unit and comparing said third error check bit with an error check bit included in the output of said third delay unit to generate a first error detection signal;
a second error detector, connected to said fourth delay unit, for calculating a fourth error check bit for the output of said fourth delay unit and comparing said fourth error check bit with an error check bit included in the output of said fourth delay unit to generate a second error detection signal;
a logic unit, connected to said first and second error detector, for generating a control signal in accordance with said first and second error detection signals; and
a switching unit, connected to said third and fourth delay, units and said logic unit, for passing one of outputs of said third and fourth delay units in accordance with said control signal,
a sum of said first delay time period of said one of said nodes and said third delay time period of said one of other nodes and a sum of said second delay time period of said one of said nodes and said fourth delay time period of said one of other nodes being determined so that a transmission time of data from said branching unit of said one of said nodes to said switching unit of said one of other nodes via said L-ring is substantially equal to a transmission time of data from said branching unit of said one of said nodes to said switching unit of said one of other nodes via said R-ring.

8. A ring-type network system including a plurality of nodes connected by a counterclockwise transmission line (L-ring) and a clockwise transmission line (R-ring), each of said nodes comprising:
a first error check bit allocating unit for calculating an error check bit for data directed to one of other nodes and allocating said error check bit to the data;
a branch unit, said error check bit allocating unit, for branching data directed to one of other nodes to first and second directions;
a first delay unit, connected to said branch unit, for delaying the data in said first direction by a first delay time period;
a second delay unit, connected to said branch unit, for delaying the data in said second direction by a second delay time period;
a first combiner, connected to said first delay unit, for inserting the delayed data in said first direction into a first time slot of a data frame on said L-ring;
a second combiner, connected to said second delay unit, for inserting the delayed data in said second direction into a first time slot of a data frame on said R-ring;
a first distributor for extracting data from a second time slot of a data frame on said L-ring;
a second distributor for extracting data from a second time slot of a data frame on said R-ring;
a third delay unit, connected to said first distributor, for delaying the data extracted by said first distributor by a third delay time period;
a fourth delay unit, connected to said second distributor, for delaying the data extracted by said first distributor by a third delay time period;

a first error detector, connected to said third delay unit, for calculating a third error check bit for the output of said third delay unit and comparing said third error check bit with an error check bit included in the output of said third delay unit to generate a first error detection signal;

a second error detector, connected to said fourth delay unit, for calculating a fourth error check bit for the output of said fourth delay unit and comparing said fourth error check bit with an error check bit included in the output of said fourth delay unit to generate a second error detection signal;

a logic unit, connected to said first and second error detector, for generating a control signal in accordance with said first and second error detection signals; and a switching unit, connected to said third and fourth delay units and said logic unit, for passing one of outputs of said third and fourth delay units in accordance with said control signal, a sum of said first delay time period of said one of said nodes and said third delay time period of said one of other nodes and a sum of said second delay time period of said one of said nodes and said fourth delay time period of said one of other nodes being determined so that a transmission time of data from said branching unit of said one of said nodes to said switching unit of said one of other nodes via said L-ring is substantially equal to a transmission time of data from said branching unit of said one of said nodes to said switching unit of said one of other nodes via said R-ring.

* * * * *